(12) United States Patent
Kim et al.

(10) Patent No.: US 8,520,319 B2
(45) Date of Patent: Aug. 27, 2013

(54) ZOOM LENS BARREL ASSEMBLY

(75) Inventors: Young-eun Kim, Suwon-si (KR);
Chan-ho Lee, Gimhae-si (KR);
Hyun-min Oh, Hwaseong-si (KR);
Hee-yun Chung, Suwon-si (KR);
Bong-chan Kim, Suwon-si (KR);
Jong-jun Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 56 days.

(21) Appl. No.: 13/280,575

(22) Filed: Oct. 25, 2011

(65) Prior Publication Data

US 2012/0206820 A1     Aug. 16, 2012

(30) Foreign Application Priority Data

Feb. 11, 2011     (KR) ........................ 10-2011-0012471

(51) Int. Cl.
*G02B 15/14*     (2006.01)
(52) U.S. Cl.
USPC ........... 359/701; 359/699; 359/700; 359/702; 359/694
(58) Field of Classification Search
USPC .................. 359/694–706, 823, 825; 396/63, 396/85, 348–350, 379, 72–79
See application file for complete search history.

(56) References Cited

U.S. PATENT DOCUMENTS

| | | | | |
|---|---|---|---|---|
| 6,046,864 A * | 4/2000 | Onda | ............................. | 359/819 |
| 6,072,639 A * | 6/2000 | Onda | ............................. | 359/694 |
| 6,469,841 B2 * | 10/2002 | Nomura et al. | ................ | 359/699 |
| 6,643,074 B2 * | 11/2003 | Nomura et al. | ................ | 359/700 |
| 6,873,472 B2 * | 3/2005 | Suzuki | ........................... | 359/699 |
| 7,130,132 B2 | 10/2006 | Lee | | |
| 7,436,602 B2 * | 10/2008 | Ishizuka et al. | ................ | 359/700 |
| 7,916,400 B2 * | 3/2011 | Zou et al. | ....................... | 359/700 |
| 2002/0030896 A1 | 3/2002 | Lee et al. | | |
| 2007/0092246 A1 | 4/2007 | Aoki et al. | | |
| 2010/0020412 A1 | 1/2010 | Iwasaki | | |

OTHER PUBLICATIONS

PCT Search Report and Written Opinion established for PCT/KR2012/000272 (Sep. 14, 2012).

* cited by examiner

*Primary Examiner* — Loha Ben
(74) *Attorney, Agent, or Firm* — Drinker Biddle & Reath LLP

(57) ABSTRACT

A zoom lens barrel assembly including: a first zoom ring comprising a first protrusion; a guide ring disposed around the first zoom ring comprising a first guide slot through which the first protrusion passes, and a second guide slot; a second zoom ring comprising a second protrusion, and movable in an axial direction; a first cylinder comprising a guide groove into which the second protrusion inserts, and a third protrusion passing through the second guide slot, and disposed between the first and second zoom rings; a second cylinder disposed around the guide ring comprising a fourth protrusion, a first groove portion into which the first protrusion inserts, and a second groove portion into which the third protrusion inserts, and supporting the first zoom ring and the first cylinder; and an external cylinder disposed around the second cylinder and comprising a third groove portion into which the fourth protrusion inserts.

10 Claims, 7 Drawing Sheets

ZOOM LENS BARREL ASSEMBLY

CROSS-REFERENCE TO RELATED PATENT APPLICATION

This application claims the priority benefit of Korean Patent Application No. 10-2011-0012471, filed on Feb. 11, 2011, in the Korean Intellectual Property Office, the entirety of which is incorporated herein by reference.

BACKGROUND

1. Field of the Invention

The invention relates to a zoom lens barrel assembly, and more particularly to, a zoom lens barrel assembly that implements a high magnification zooming function while having a small thickness or short length when the zoom lens barrel assembly is accommodated in a camera.

2. Description of the Related Art

An optical system having various focal distances is realized when a zoom lens barrel assembly that is able to adjust distances between lens groups is mounted in a camera. The zoom lens barrel assembly can be used to change the optical system of the camera between a wide angle lens system or a telephoto lens system so that a user can perform photographing at various viewing angles without moving.

Relative positions of barrels that support lens groups must be changed to adjust distances between the lens groups. For example, five magnification zooming may be implemented using a 3-step zoom lens barrel assembly having 3 relatively movable barrels. However, such implementation increases the number of parts in the 3-step zoom lens barrel assembly.

When no photographing is performed, elements of a zoom lens barrel assembly may be accommodated in a camera. In this regard, a thickness or length of the zoom lens barrel assembly may be minimized in order to realize a compact camera having a small thickness to meet market demand.

Recently, a compact camera may be required to implement, for example, a high-performance five magnification zooming function, and thus a zoom lens barrel assembly in the camera must perform a high-performance zooming function while having a small thickness or short length. However, 3 relatively movable barrels must be disposed in the 3-step zoom lens barrel assembly to implement five magnification zooming. Thus, reduction of a minimum thickness of the zoom lens barrel assembly is difficult when the 3-step zoom lens barrel assembly is accommodated.

SUMMARY

The invention provides a zoom lens barrel assembly that implements a high-magnification zooming function while having a small thickness or short length when the zoom lens barrel assembly is accommodated within an optical device such as a camera.

The invention also provides a zoom lens barrel assembly having a reduced number of parts.

The invention also provides a zoom lens barrel assembly that implements a high-magnification zooming function while having a small thickness or short length and a reduced number of relatively moving barrels.

According to an aspect of the invention, there is provided a zoom lens barrel assembly including: a first zoom ring for supporting a first lens group and comprising a first protrusion protruding outward; a guide ring comprising a first guide slot extending in an axial direction, through which the first protrusion passes, and a second guide slot extending in a circumferential direction, and disposed around the first zoom ring; a second zoom ring for supporting a second lens group, comprising a second protrusion protruding outward, and movably disposed in the axial direction with respect to the first zoom ring; a first cylinder comprising a second zoom ring guide groove formed in an inner wall surface of the first cylinder into which the second protrusion is inserted and a third protrusion protruding outward so as to pass through the second guide slot, and disposed between the first zoom ring and the second zoom ring so as to rotate and move in the axial direction; a second cylinder comprising a fourth protrusion protruding outward, rotatably disposed around the guide ring, comprising a first groove portion into which the first protrusion passing through the first guide slot is inserted, and a second groove portion into which the third protrusion passing through the second guide slot is inserted, and movably supporting the first zoom ring and the first cylinder; and an external cylinder comprising a third groove portion into which the fourth protrusion is inserted, and disposed around the second cylinder to rotatably support the second cylinder.

The zoom lens barrel assembly may further include: a guide portion disposed guiding a motion of the second zoom ring in the axial direction while the first cylinder rotates.

The second zoom ring may include a cutting portion extending in the axial direction in the outside thereof, and the guide portion is disposed between the second zoom ring and the first cylinder, coupled to the cutting portion, and guides a motion of the second zoom ring in the axial direction.

The second zoom ring may include a guide slot extending in the axial direction, and the guide portion is pin-shaped extending in the axial direction, inserted into the guide slot, and guides a motion of the second zoom ring in the axial direction.

The second cylinder may include a gear disposed around the second cylinder and extending in the circumferential direction, and the zoom lens barrel assembly may include a driving portion coupled to the gear and for generating a driving force used to rotate the second cylinder.

The zoom lens barrel assembly may further include: a base fixed to the external cylinder; and an optical device disposed in the base so that the optical device corresponds to the first lens group and the second lens group.

The zoom lens barrel assembly may further include: a third lens group disposed between the optical device and the second lens group; a third zoom ring for supporting the third lens group and moving in the axial direction; and a focus driving unit coupled to the third zoom ring and generating a driving force.

The second groove portion may extend in the axial direction, and the second guide slot may include a sustaining portion extending in the circumferential direction along or parallel to a boundary of one end of the guide ring and sustaining a position of the first cylinder in the axial direction with respect to the guide ring, and a changing portion inclined from an end portion of the sustaining portion toward a boundary of another end of the guide ring and for changing the position of the first cylinder in the axial direction with respect to the guide ring.

The first groove portion may include a first inclination portion inclined from a boundary of one end of the second cylinder toward a boundary of another end thereof, extending in the circumferential direction, and moving the first zoom ring forward in the axial direction with respect to the second cylinder, and a second inclination portion inclined from an end portion of the first inclination portion toward the boundary of the one end, extending in the circumferential direction, and moving the first zoom ring backward in the axial direction with respect to the second cylinder.

The second zoom ring guide groove may include a rectilinear portion rectilinearly extending in the axial direction from a boundary of one end of the first cylinder to a boundary of another end thereof, a backward inclination portion inclined from an end portion of the rectilinear portion toward the boundary of the one end of the first cylinder, extending in the circumferential direction, and moving the second zoom ring forward in the axial direction with respect to the first cylinder, and a forward inclination portion inclined from the backward inclination portion toward the boundary of the other end of the first cylinder, extending in the circumferential direction, and moving the second zoom ring forward in the axial direction with respect to the first cylinder.

BRIEF DESCRIPTION OF THE DRAWINGS

The above and other features and advantages of the invention will become more apparent by describing in detail exemplary embodiments thereof with reference to the attached drawings in which.

DETAILED DESCRIPTION

Hereinafter, the invention will be described more fully with reference to the accompanying drawings, in which exemplary embodiments of the invention are shown.

Figure 1:
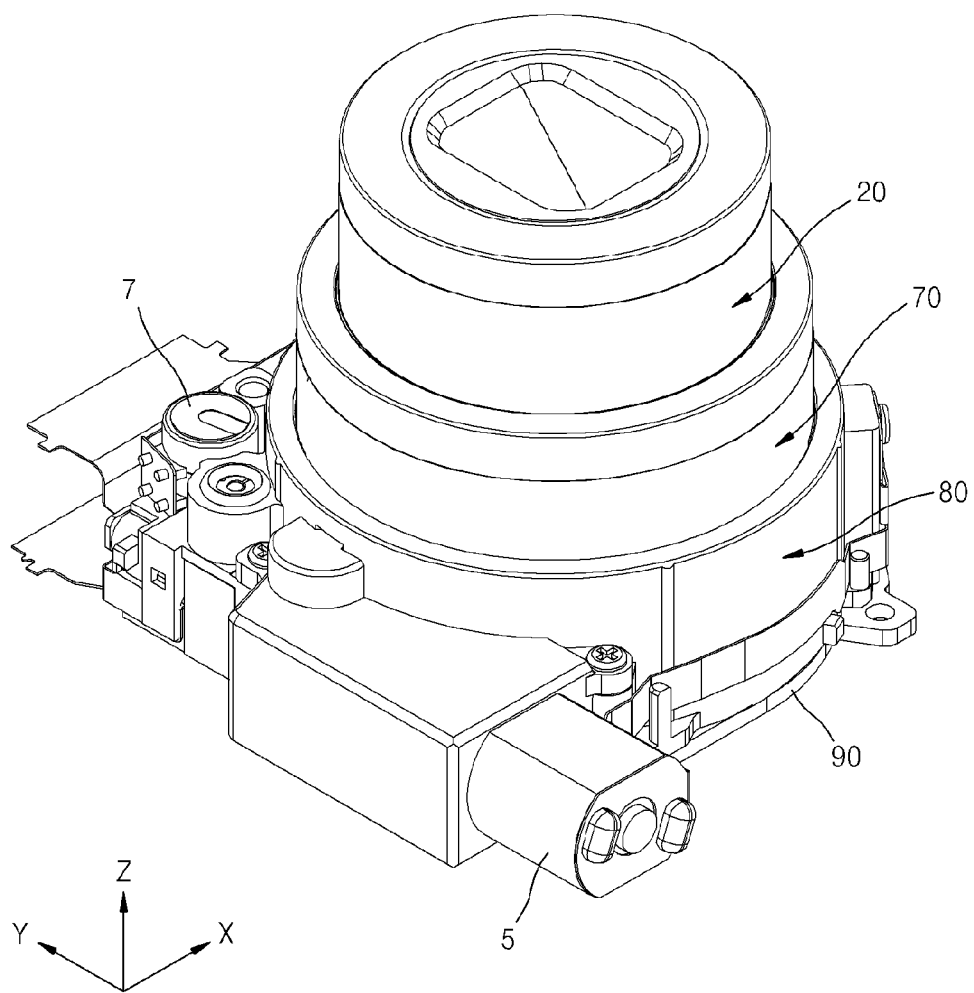
FIG. 1 is a perspective view of a zoom lens barrel assembly, according to an embodiment of the invention.

FIG. 1 is a perspective view of a zoom lens barrel assembly according to an embodiment of the invention. Referring to FIG. 1, the zoom lens barrel assembly unfolds in 2 steps and performs a 5-magnification optical zooming function.

The zoom lens barrel assembly includes an external cylinder 80 installed in a base 90, a first zoom ring 20 movably disposed in the external cylinder 80, and a second cylinder 70. The second cylinder 70 is disposed to move forward or backward from the external cylinder 80 in an axial direction (in a Z direction). The first zoom ring 20 is disposed to move forward or backward from the second cylinder 70 in the axial direction.

The zoom lens barrel assembly can perform a zooming function because the first zoom ring 20 and the second cylinder 70, which move from the external cylinder 80 fixed in the base 90 in the axial direction, are unfolded in 2 steps. Thus, a whole thickness or length of the zoom lens barrel assembly can be reduced when the first zoom ring 20 and the second cylinder 70 are accommodated in the external cylinder 80, thereby easily implementing a small-sized and thin-shaped camera.

A driving unit 5 that generates a driving force for performing the zooming function and a focus driving unit 7 that generates a driving force for performing a focusing function are disposed in exterior surfaces of the base 90 and the external cylinder 80.

Figure 2:
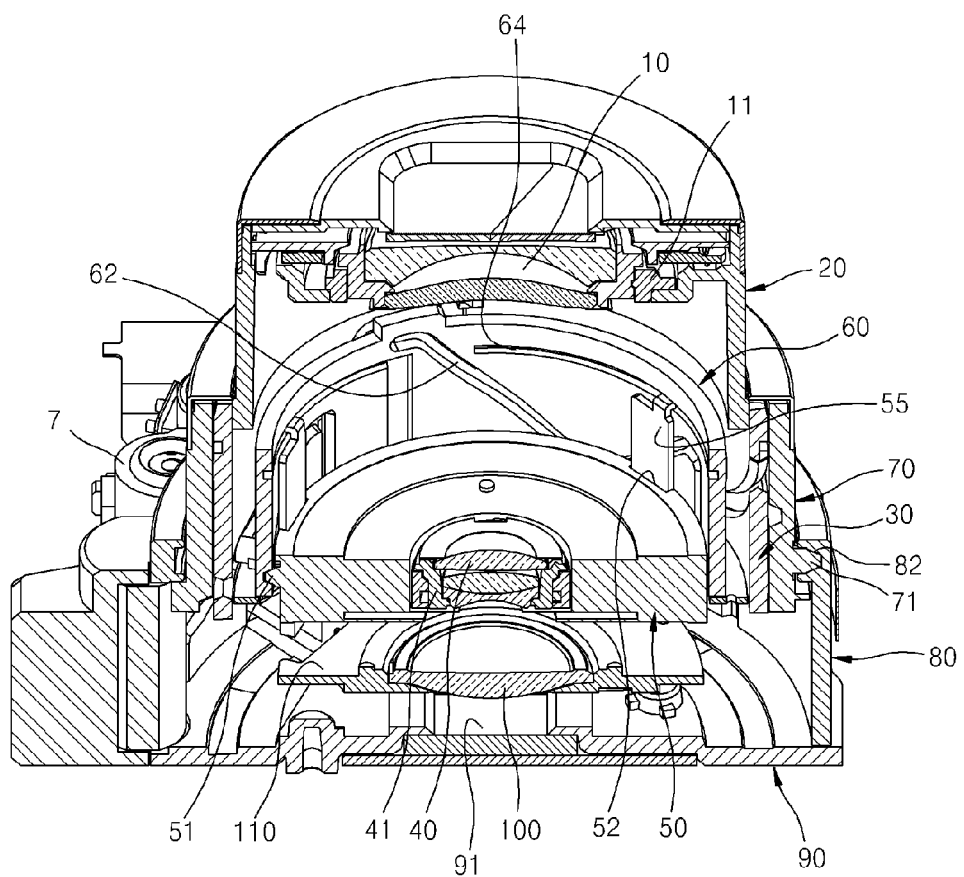
FIG. 2 is a cross-sectional perspective view of the zoom lens barrel assembly of FIG. 1, according to an embodiment of the invention.
Figure 2:
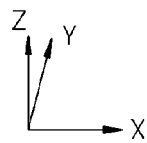
Figure 3:
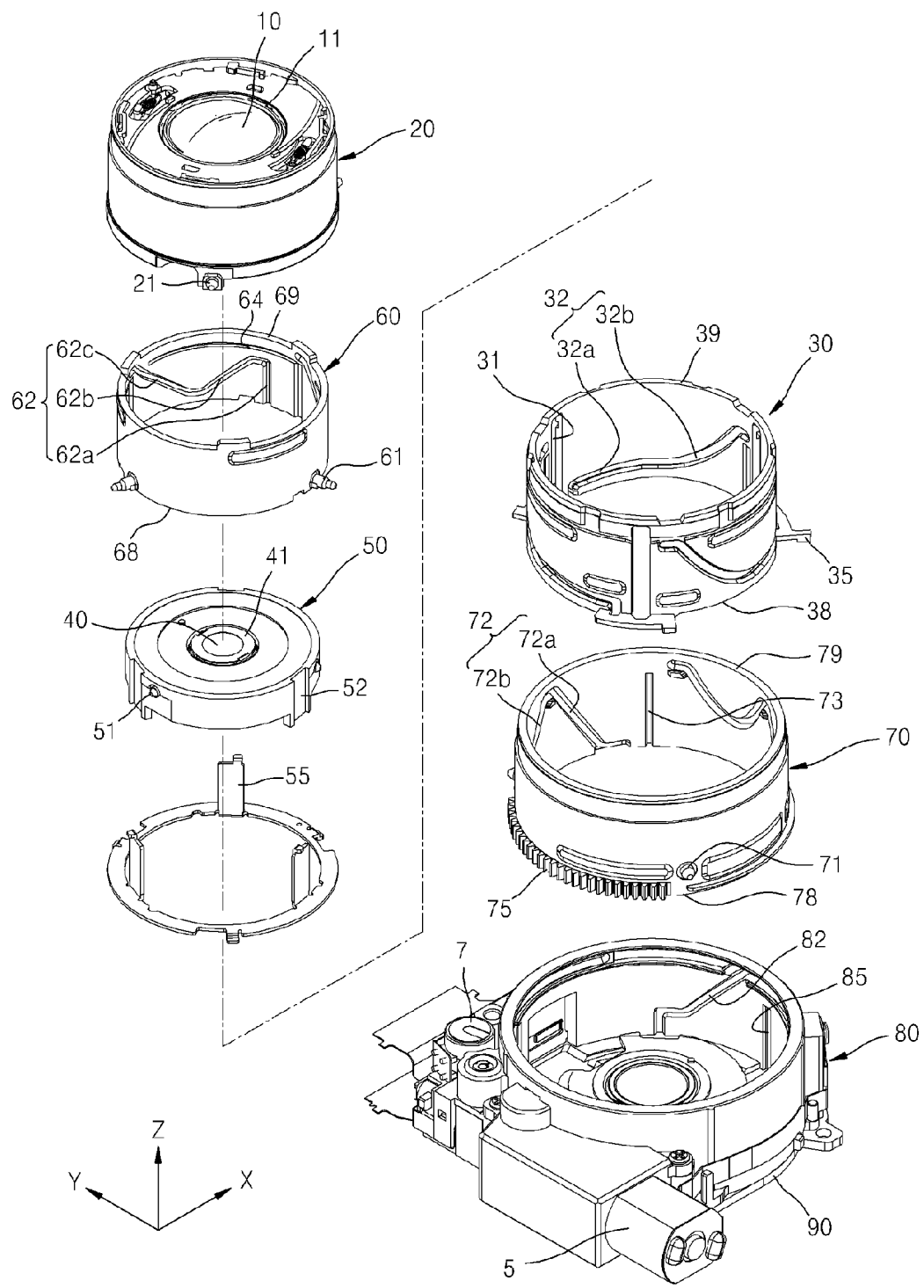
FIG. 3 is an exploded perspective view of the zoom lens barrel assembly of FIG. 1, according to an embodiment of the invention.

FIG. 2 is a cross-sectional perspective view of the zoom lens barrel assembly of FIG. 1, according to an embodiment of the invention. FIG. 3 is an exploded perspective view of the zoom lens barrel assembly of FIG. 1, according to an embodiment of the invention.

Referring to FIGS. 2 and 3, the zoom lens barrel assembly comprises the first zoom ring 20 that supports a first lens group 10, a guide ring 30 disposed around the first zoom ring 20, a second zoom ring 50 that supports a second lens group 40, a first cylinder 60 disposed between the first zoom ring 20 and the second zoom ring 50, a second cylinder 70 that is disposed around the guide ring 30, and movably supports the first zoom ring 20 and the first cylinder 60, and an external cylinder 80 that is disposed around the second cylinder 70.

The external cylinder 80 acts as a support structure that maintains a fixed state in the zoom lens barrel assembly.

When the zoom lens barrel assembly operates and performs the zooming function, the first zoom ring 20 protrudes forward in the axial direction (in the Z direction) with respect to the second cylinder 70. The first zoom ring 20 has a cylindrical shape, supports the first lens group 10, and comprises a first protrusion 21 that protrudes to the outside of the first zoom ring 20. The first lens group 10 is coupled to a front of the first zoom ring 20 using a lens support portion 11 disposed therebetween. The first zoom ring 20 moves forward or backward in the axial direction, and thus a position of the first lens group 10 with respect to the axial direction can be adjusted.

The guide ring 30 has a hollow cylindrical shape and is disposed outside the first zoom ring 20. An inner wall surface of the guide ring 30 comprises a first guide slot 31 that rectilinearly extends in the axial direction, through which the first protrusion 21 of the first zoom ring 20 passes, and a second guide slot 32 that is inclined in the axial direction and extends in the circumferential direction. The first guide slot 31 guides a movement of the first protrusion 21 to cause the first zoom ring 20 to perform a rectilinear motion in the axial direction.

A rectilinear guide protrusion 35 that protrudes to the outside of the guide ring 30 is screwed to a rectilinear groove portion 85 that rectilinearly extends in the inner wall surface of the external cylinder 80 in the axial direction. Thus, although the guide ring 30 is disposed in the second cylinder 70, the guide ring 30 does not rotate with respect to the external cylinder 80 and rectilinearly moves in the axial direction, together with the second cylinder 70, when the second cylinder 70 rotates with respect to the external cylinder 80.

The first cylinder 60 is disposed in the guide ring 30. The first cylinder 60 has a hollow cylindrical shape, comprises a second protrusion 61 that protrudes to the outside of the first cylinder 60, and moves in the axial direction while rotating. The second protrusion 61 of the first cylinder 60 is inserted into the second guide slot 32 of the guide ring 30 so that the guide ring 30 can movably support the first cylinder 60.

An exterior diameter of the first cylinder 60 is smaller than an interior diameter of the first zoom ring 20. Thus, when the first zoom ring 20 and the first cylinder 60 are guided by the guide ring 30 and move in the axial direction, the first cylinder 60 can be inserted into the first zoom ring 20.

The second zoom ring 50 is movably disposed in the first cylinder 60. The second zoom ring 50 supports the second lens group 40. The second lens group 40 is coupled to the second zoom ring 50 using a lens support portion 41 disposed therebetween.

The second zoom ring 50 comprises a third protrusion 51 that protrudes to the outside of the second zoom ring 50. The third protrusion 51 of the second zoom ring 50 is inserted into a second zoom ring guide groove 62 formed in an inner wall surface of the first cylinder 60, and thus the rotation of the first cylinder 60 causes the third protrusion 51 to be guided by the second zoom ring guide groove 62, and the second zoom ring 50 to rectilinearly move in the axial direction.

A cutting portion 52 that extends in the axial direction is formed in an exterior wall surface of the second zoom ring 50 in order to prevent the second zoom ring 50 from rotating, and to rectilinearly move in the axial direction. A guide portion 55 that is coupled to the cutting portion 52 and guides a motion of the second zoom ring 50 in the axial direction is disposed between the second zoom ring 50 and the first cylinder 60. The guide portion 55 is screwed to a guide portion guide groove 64 that extends in the inner wall surface of the first cylinder 60 in the circumferential direction, and thus the first cylinder 60 rotates while the guide portion 55 guides the cutting portion 52. The guide portion 55 is coupled to the cutting portion 52, thereby fixing a position of the second zoom ring 50 in the circumferential direction of the guide portion 55.

As described above, because the rotation of the first cylinder 60 causes the second zoom ring 50 to move in the first cylinder 60 in the axial direction, which changes a relative position of the second lens group 40 in the axial direction with respect to the first lens group 10, the zooming function is realized.

Figure 7:
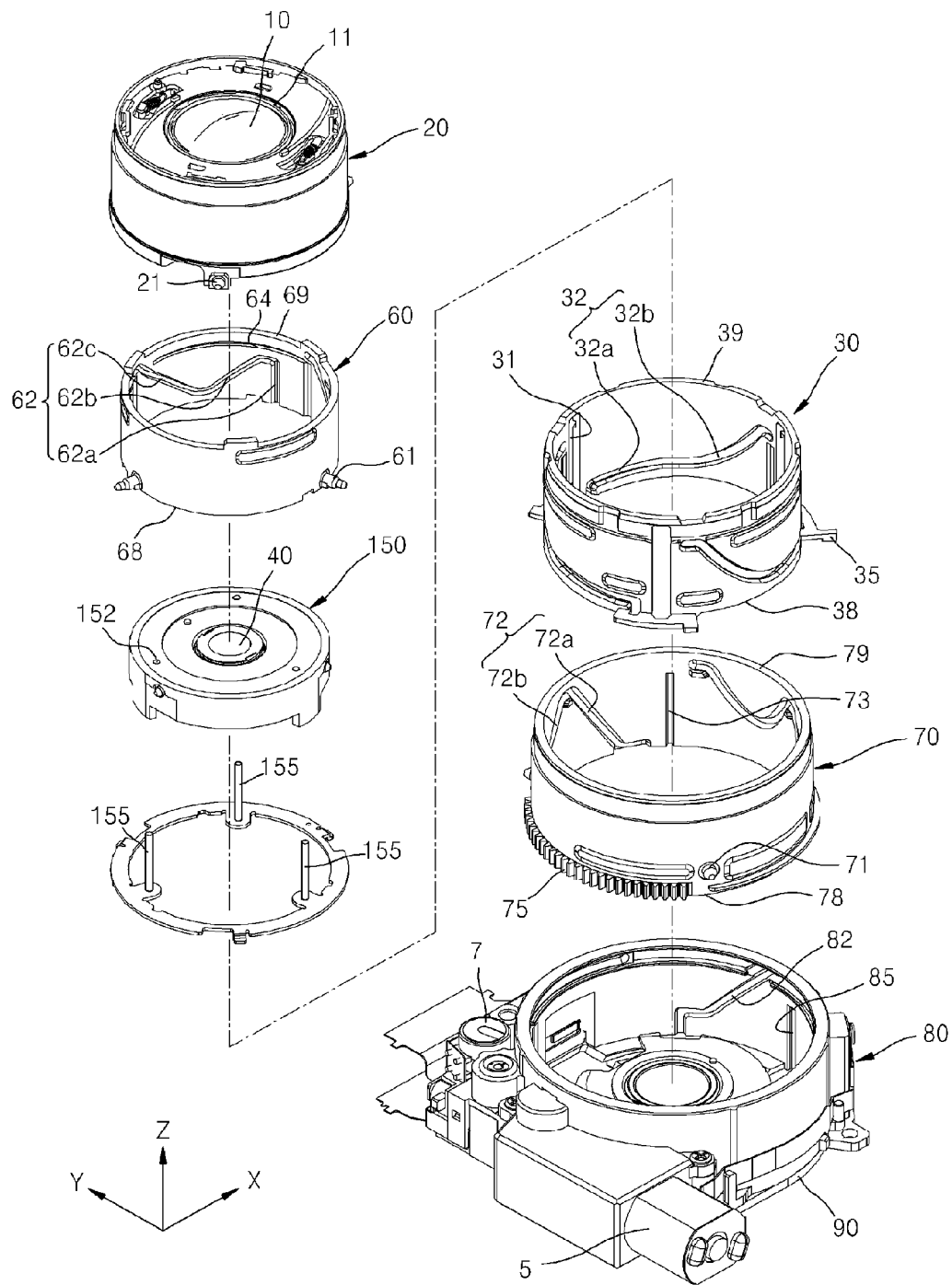
FIG. 7 is an exploded perspective view of a zoom lens barrel assembly, according to another embodiment of the invention.

Although the cutting portion 52 and the guide portion 55 are used to guide the second zoom ring 50 to rectilinearly move in the axial direction without rotating during the rotation of the first cylinder 60 in the present embodiment, the invention is not limited thereto. For example, FIG. 7 is an exploded perspective view of a zoom lens barrel, according to another embodiment. In FIG. 7, a pin 155 extending in the axial direction and a guide slot 152 extending in the second zoom ring 150 in the axial direction, through which the pin 155 is inserted, may be used to guide the second zoom ring 150 to rectilinearly move in the axial direction during the rotation of the first cylinder 60.

The second cylinder 70 is rotatably disposed around the guide ring 30. The second cylinder 70 has a hollow cylindrical shape and comprises a fourth protrusion 71 that protrudes to the outside of the second cylinder 70. An inner wall surface of the second cylinder 70 comprises a first groove portion 72 to which the first protrusion 21 passing through the first guide slot 31 of the guide ring 30 is screwed, and a second groove portion 73 to which the second protrusion 61 passing through the second guide slot 32 of the guide ring 30 is screwed. Thus, the second cylinder 70 movably supports the first zoom ring 20 and the first cylinder 60 and guides a movement of the first zoom ring 20 and the first cylinder 60.

The first groove portion 72 comprises a first inclination portion 72a that is inclined from a boundary 78 of one end of the second cylinder 70 to a boundary 79 of another end thereof and extends in the circumferential direction, and a second inclination portion 72b that is inclined from an end portion of the first inclination portion 72a to the boundary 78 and extends in the circumferential direction.

The first inclination portion 72a performs a function of moving the first zoom ring 20 forward in the axial direction with respect to the second cylinder 70. The second inclination portion 72b performs a function of moving the first zoom ring 20 backward in the axial direction with respect to the second cylinder 70.

A third groove portion 82 is formed in an inner wall surface of the external cylinder 80. The second cylinder 70 is disposed in the external cylinder 80, and the fourth protrusion 71 of the second cylinder 70 is screwed to the third groove portion 82, so that the external cylinder 80 rotatably supports the second cylinder 70. Because the fourth protrusion 71 is guided by the third groove portion 82 of the external cylinder 80, rotation of the second cylinder 70 causes the second cylinder 70 to move in the axial direction.

A gear 75 that extends in the circumferential direction is installed on an exterior wall surface of the second cylinder 70. The driving portion 5 of FIG. 1 is connected to the gear 75, and thus a driving force generated by the driving portion 5 is transferred to the gear 75, and the second cylinder 70 rotates with respect to the external cylinder 80.

The base 90 is coupled to an end portion of the external cylinder 80. An optical device 91 that converts image light transmitted through the first lens group 10 and the second lens group 40 into an electrical signal is disposed in the base 90. The optical device 91 is disposed at a position corresponding to the first lens group 10 and the second lens group 40.

A third lens group 100 is disposed between the optical device 91 and the second lens group 40. The third lens group 100 can move in the axial direction so as to realize a focusing function.

The third lens group 100 is supported by a third zoom ring 110. The focus driving unit 7 is coupled to the third zoom ring 110. The third zoom ring 110 can move in the axial direction by a driving force generated by the focus driving unit 7, and thus a position of the third lens group 100 in the axial direction can be adjusted.

The second guide slot 32 comprises a sustaining portion 32a that extends in the circumferential direction parallel to a boundary 38 of one end of the guide ring 30, and a changing portion 32b that is inclined from an end portion of the sustaining portion 32a to a boundary 39 of another end of the guide ring 30 and extends in the circumferential direction.

The sustaining portion 32a performs a function of sustaining a position of the first cylinder 60 in the axial direction with respect to the guide ring 30 during an initial predetermined section in which the second cylinder 70 starts rotating. The changing portion 32b performs a function of changing the position of the first cylinder 60 in the axial direction with respect to the guide ring 30.

The second zoom ring guide groove 62 formed in the inner wall surface of the first cylinder 60 comprises a rectilinear portion 62a that rectilinearly extends in the axial direction from a boundary 68 of one end of the first cylinder 60 toward a boundary 69 of another end thereof, a backward inclination portion 62b that is inclined from an end portion of the rectilinear portion 62a toward the boundary 68 of the one end of the first cylinder 60 and extends in the circumferential direction, and a forward inclination portion 62c that is inclined from the backward inclination portion 62b toward the boundary 69 of the other end of the first cylinder 60 and extends in the circumferential direction.

The rectilinear portion 62a performs a function of moving the second zoom ring 50 forward in the axial direction with respect to the first cylinder 60. The backward inclination portion 62b performs a function of moving the second zoom ring 50 backward in the axial direction with respect to the first cylinder 60. The forward inclination portion 62c performs a function of moving the second zoom ring 50 forward in the axial direction with respect to the first cylinder 60.

Figure 4:
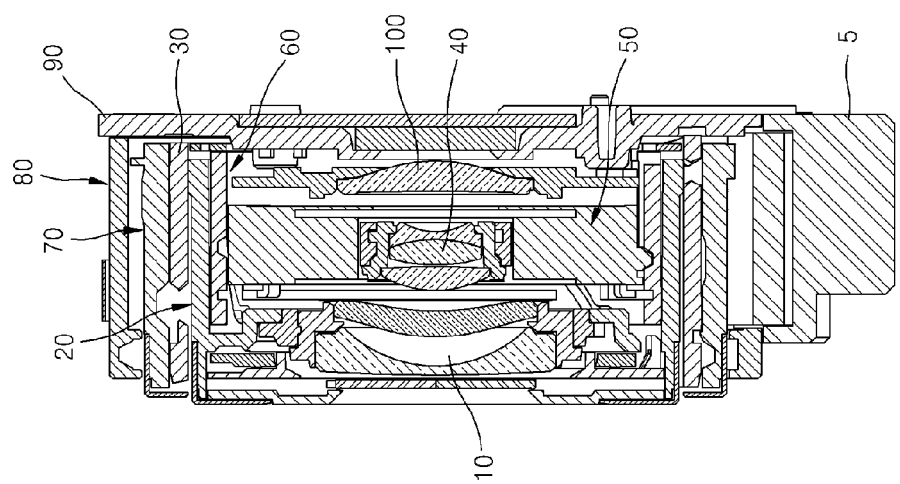
FIG. 4 is a cross-sectional view of the zoom lens barrel assembly of FIG. 1, according to an embodiment of the invention.
Figure 5:
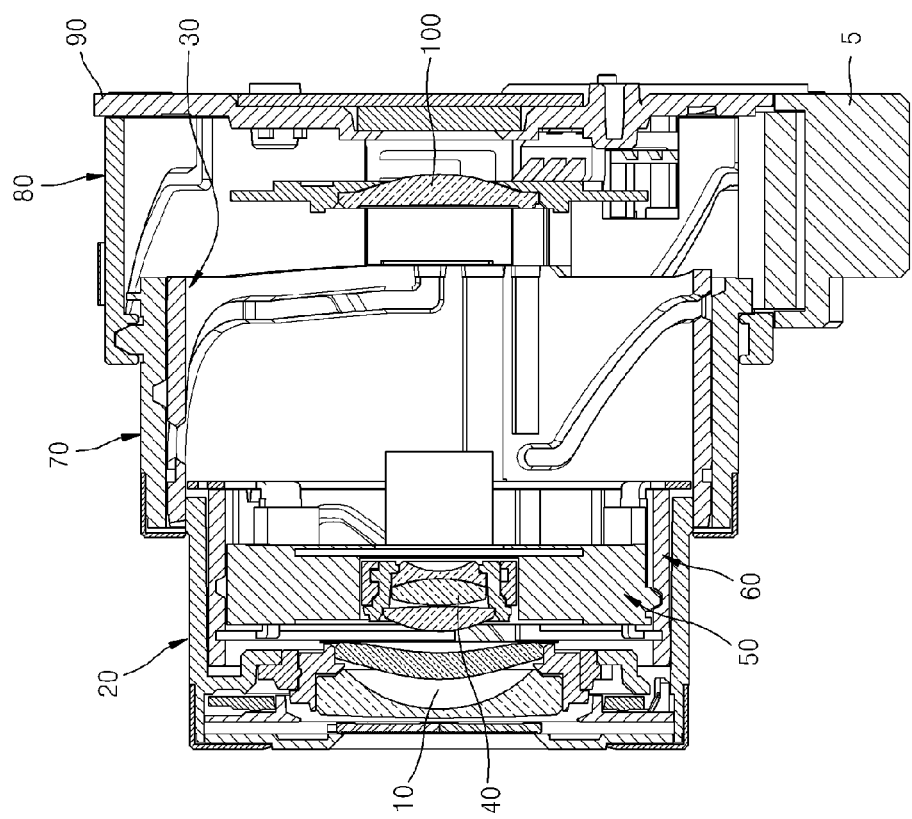
FIG. 5 is a cross-sectional view of the zoom lens barrel assembly of FIG. 4 that is adjusted at a wide-angle lens and performs zooming, according to an embodiment of the invention.
Figure 6:
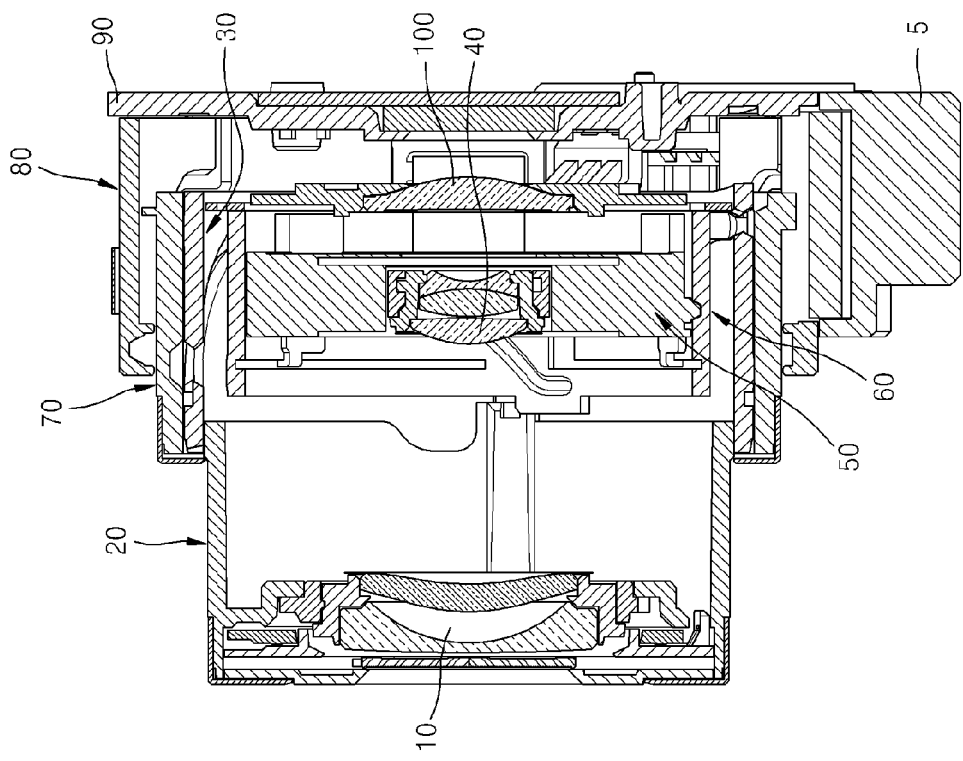
FIG. 6 is a cross-sectional view of the zoom lens barrel assembly of FIG. 4 that is adjusted at a telephoto-angle lens and performs zooming, according to an embodiment of the invention.

FIG. 4 is a cross-sectional view of the zoom lens barrel assembly of FIG. 1, according to an embodiment of the invention. FIG. 5 is a cross-sectional view of the zoom lens barrel assembly of FIG. 4 that is adjusted at a wide-angle lens and performs zooming, according to an embodiment of the invention. FIG. 6 is a cross-sectional view of the zoom lens barrel assembly of FIG. 4 that is adjusted at a telephoto-angle lens and performs zooming, according to an embodiment of the invention.

When the zoom lens barrel assembly is accommodated in a camera or other optical device, all of the second cylinder 70, the first cylinder 60, and the first zoom ring 20 are accommodated in the external cylinder 80. The zoom lens barrel assembly adopts a 2-step barrel structure in which the second cylinder 70 and the first zoom ring 20 protrude in the axial direction with respect to the external cylinder 80, and thus having a small thickness or short length when the zoom lens barrel assembly is accommodated in an optical device such as a camera, while implementing a high-magnification zooming function.

If the driving portion 5 operates and generates a driving force, the second cylinder 70 rotates with respect to the external cylinder 80. The rotational force of the second cylinder 70 is transferred to the first protrusion 21 of the first zoom ring 20 screwed to the first groove portion 72 and to the second protrusion 61 of the first cylinder 60 screwed to the second groove portion 73.

The guide ring 30 does not rotate with respect to the external cylinder 80 and rectilinearly moves in the axial direction, together with the second cylinder 70, when the second cylinder 70 rotates with respect to the external cylinder 80. Therefore, the first zoom ring 20 can rectilinearly move in the axial direction according to the first protrusion 21 passing through the first guide slot 31 of the guide ring 30. The first cylinder 60 can rotate with respect to the guide ring 30 and move in the axial direction according to the second protrusion 61 passing through the second guide slot 32 of the guide ring 30.

Relative positions of the first lens group 10 and the second lens group 40 are changed owing to the rotation of the second cylinder 70, and thus the zoom lens barrel assembly can be adjusted at a wide-angle lens as shown in FIG. 5 or at a telephoto-angle lens as shown in FIG. 6.

The embodiments described herein may comprise a memory for storing program data, a processor for executing the program data, a permanent storage such as a disk drive, a communications port for handling communications with external devices, and user interface devices, including a display, keys, etc. When software modules are involved, these software modules may be stored as program instructions or computer-readable codes, which are executable by the processor, on a non-transitory or tangible computer-readable media such as read-only memory (ROM), random-access memory (RAM), a compact disc (CD), a digital versatile disc (DVD), magnetic tapes, floppy disks, optical data storage devices, an electronic storage media (e.g., an integrated circuit (IC), an electronically erasable programmable read-only memory (EEPROM), and/or a flash memory), a quantum storage device, a cache, and/or any other storage media in which information may be stored for any duration (e.g., for extended time periods, permanently, brief instances, for temporarily buffering, and/or for caching of the information). The computer-readable recording medium can also be distributed over network-coupled computer systems (e.g., a network-attached storage device, a server-based storage device, and/or a shared network storage device) so that the computer-readable code may be stored and executed in a distributed fashion. This media can be read by the computer, stored in the memory, and executed by the processor. As used herein, a computer-readable storage medium excludes any computer-readable media on which signals may be propagated. However, a computer-readable storage medium may include internal signal traces and/or internal signal paths carrying electrical signals therein Any references, including publications, patent applications, and patents, cited herein are hereby incorporated by reference to the same extent as if each reference were individually and specifically indicated to be incorporated by reference and were set forth in its entirety herein.

For the purposes of promoting an understanding of the principles of the invention, reference has been made to the embodiments illustrated in the drawings, and specific language has been used to describe these embodiments. However, no limitation of the scope of the invention is intended by this specific language, and the invention should be construed to encompass all embodiments that would normally occur to one of ordinary skill in the art.

The invention may be described in terms of functional block components and various processing steps. Such functional blocks may be realized by any number of hardware and/or software components configured to perform the specified functions. For example, the invention may employ various integrated circuit components, e.g., memory elements, processing elements, logic elements, look-up tables, and the like, which may carry out a variety of functions under the control of one or more microprocessors or other control devices. Similarly, where the elements of the invention are implemented using software programming or software elements the invention may be implemented with any programming or scripting language such as C, C++, Java, assembler, or the like, with the various algorithms being implemented with any combination of data structures, objects, processes, routines or other programming elements. Functional aspects may be implemented in algorithms that execute on one or more processors. Furthermore, the invention could employ any number of conventional techniques for electronics configuration, signal processing and/or control, data processing and the like. The words "mechanism" and "element" are used broadly and are not limited to mechanical or physical embodiments, but can include software routines in conjunction with processors, etc.

The particular implementations shown and described herein are illustrative examples of the invention and are not intended to otherwise limit the scope of the invention in any way. For the sake of brevity, conventional electronics, control systems, software development and other functional aspects of the systems (and components of the individual operating components of the systems) may not be described in detail. Furthermore, the connecting lines, or connectors shown in the various presented are intended to represent exemplary functional relationships and/or physical or logical couplings between the various elements. It should be noted that many alternative or additional functional relationships, physical connections or logical connections may be present in a practical device. Moreover, no item or component is essential to the practice of the invention unless the element is specifically described as "essential" or "critical".

The use of the terms "a" and "an" and "the" and similar referents in the context of describing the invention (especially in the context of the following claims) are to be construed to cover both the singular and the plural. Furthermore, recitation of ranges of values herein are merely intended to serve as a shorthand method of referring individually to each separate value falling within the range, unless otherwise indicated herein, and each separate value is incorporated into the specification as if it were individually recited herein. Finally, the steps of all methods described herein can be performed in any suitable order unless otherwise indicated herein or otherwise clearly contradicted by context. The use of any and all examples, or exemplary language (e.g., "such as" or "for example") provided herein, is intended merely to better illuminate the invention and does not pose a limitation on the scope of the invention unless otherwise claimed. Numerous modifications and adaptations will be readily apparent to those skilled in this art without departing from the spirit and scope of the invention.

According to the embodiments of the invention, 5-magnification optical zooming can be implemented using a 2-step zoom lens barrel assembly that unfolds a first zoom ring and a second cylinder in 2 steps, and thus the 2-step zoom lens barrel assembly has a reduced number of parts. Further, the number of relatively moving barrels is reduced, and thus a zoom lens barrel assembly having a small thickness or short length is realized when the zoom lens barrel assembly is accommodated in an optical device such as a camera.

While the invention has been particularly shown and described with reference to exemplary embodiments thereof, it will be understood by those of ordinary skill in the art that various changes in form and details may be made therein without departing from the spirit and scope of the invention as defined by the following claims.

What is claimed is:

1. A zoom lens barrel assembly comprising:
    a first zoom ring for supporting a first lens group and comprising a first protrusion protruding outward;
    a guide ring comprising a first guide slot extending in an axial direction, through which the first protrusion passes, and a second guide slot extending in a circumferential direction, and disposed around the first zoom ring;
    a second zoom ring for supporting a second lens group, comprising a third protrusion protruding outward, and movably disposed in the axial direction with respect to the first zoom ring;
    a first cylinder comprising a second zoom ring guide groove formed in an inner wall surface of the first cylinder into which the third protrusion is inserted and a second protrusion protruding outward so as to pass through the second guide slot, and disposed between the first zoom ring and the second zoom ring so as to rotate and move in the axial direction;
    a second cylinder comprising a fourth protrusion protruding outward, rotatably disposed around the guide ring, comprising a first groove portion into which the first protrusion passing through the first guide slot is inserted, and a second groove portion into which the second protrusion passing through the second guide slot is inserted, and movably supporting the first zoom ring and the first cylinder; and
    an external cylinder comprising a third groove portion into which the fourth protrusion is inserted, and disposed around the second cylinder to rotatably support the second cylinder.

2. The zoom lens barrel assembly of claim 1, further comprising: a guide portion disposed guiding a motion of the second zoom ring in the axial direction while the first cylinder rotates.

3. The zoom lens barrel assembly of claim 2, wherein the second zoom ring further comprises a cutting portion extending in the axial direction in the outside thereof, and the guide portion is disposed between the second zoom ring and the first cylinder, coupled to the cutting portion, and guides a motion of the second zoom ring in the axial direction.

4. The zoom lens barrel assembly of claim 2, wherein the second zoom ring further comprises a guide slot extending in the axial direction, and
    the guide portion is pin-shaped extending in the axial direction, inserted into the guide slot, and guides a motion of the second zoom ring in the axial direction.

5. The zoom lens barrel assembly of claim 1, wherein the second cylinder further comprises a gear disposed around the second cylinder and extending in the circumferential direction, and
    the zoom lens barrel assembly further comprises a driving portion coupled to the gear and for generating a driving force used to rotate the second cylinder.

6. The zoom lens barrel assembly of claim 1, further comprising:
    a base fixed to the external cylinder; and
    an optical device disposed in the base so that the optical device corresponds to the first lens group and the second lens group.

7. The zoom lens barrel assembly of claim 6, further comprising:
    a third lens group disposed between the optical device and the second lens group;
    a third zoom ring for supporting the third lens group and moving in the axial direction; and
    a focus driving unit coupled to the third zoom ring and generating a driving force.

8. The zoom lens barrel assembly of claim 7, wherein the second groove portion extends in the axial direction, and the second guide slot comprises a sustaining portion extending in the circumferential direction parallel to a boundary of one end of the guide ring and sustaining a position of the first cylinder in the axial direction with respect to the guide ring, and a changing portion inclined from an end portion of the sustaining portion toward a boundary of another end of the guide ring and for changing the position of the first cylinder in the axial direction with respect to the guide ring.

9. The zoom lens barrel assembly of claim 8, wherein the first groove portion comprises a first inclination portion inclined from a boundary of one end of the second cylinder toward a boundary of another end thereof, extending in the circumferential direction, and moving the first zoom ring forward in the axial direction with respect to the second cylinder, and a second inclination portion inclined from an end portion of the first inclination portion toward the boundary of the one end, extending in the circumferential direction, and moving the first zoom ring backward in the axial direction with respect to the second cylinder.

10. The zoom lens barrel assembly of claim 9, wherein the second zoom ring guide groove comprises a rectilinear portion rectilinearly extending in the axial direction from a boundary of one end of the first cylinder toward a boundary of another end thereof, a backward inclination portion inclined from an end portion of the rectilinear portion toward the boundary of the one end of the first cylinder, extending in the circumferential direction, and moving the second zoom ring forward in the axial direction with respect to the first cylinder, and a forward inclination portion inclined from the backward inclination portion toward the boundary of the other end of the first cylinder, extending in the circumferential direction, and moving the second zoom ring forward in the axial direction with respect to the first cylinder.

\* \* \* \* \*